United States Patent

Frump

[15] 3,678,065
[45] July 18, 1972

[54] PRODUCTION OF HYDROXYMETHYL VINYL OXAZOLINE

[72] Inventor: John A. Frump, Terre Haute, Ind.
[73] Assignee: Commercial Solvents Corporation
[22] Filed: Dec. 9, 1970
[21] Appl. No.: 96,613

[52] U.S. Cl. ..................................................260/307 F
[51] Int. Cl. ..................................................C07d 85/36
[58] Field of Search..........................................270/307 F

[56] References Cited

UNITED STATES PATENTS 2,831,858 4/1958 De Benneville et al................260/244

Primary Examiner—Alex Mazel
Assistant Examiner—R. V. Rush
Attorney—Howard E. Post and Robert H. Dewey

[57] ABSTRACT

A process for the production of hydroxymethyl vinyl oxazolines corresponding to the formula:

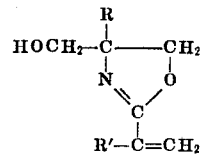

where R is methyl, ethyl, or hydroxymethyl and R' is hydrogen or methyl, comprising reacting an alkanolamine, in which to the carbon atom adjacent to the amino group there are bonded three hydroxyalkyl groups, or two hydroxyalkyl groups and an alkyl group, with an ester of acrylic acid or methacrylic acid in the presence of a catalyst and a polymerization inhibitor, thereby forming an amide, and heating said amide rapidly and briefly to within about 165°–210° C in the presence of additional polymerization inhibitor, thereby forming said hydroxymethyl vinyl oxazoline.

11 Claims, No Drawings

PRODUCTION OF HYDROXYMETHYL VINYL OXAZOLINE

BACKGROUND OF THE INVENTION

This invention relates to a process for the production of vinyl oxazolines. In a particular aspect, this invention relates to a process for the production of hydroxymethyl vinyl oxazolines.

It is known from R.F. Purcell, U.S. Pat. No. 3,248,397, that vinyl oxazolines, including hydroxymethyl-substituted vinyl oxazolines, represented by the formula

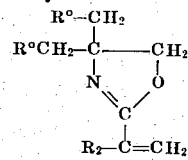

where R° is hydrogen, alkyl, hydroxyl or

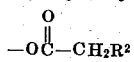

and R² is hydrogen or alkyl, are useful for the production of drying oils by homopolymerization or by copolymerizing with a dissimilar ethylenic monomer. Products of this type, prepared by the method of W. A. Jordan et al., U.S. Pat. No. 2,559,440, have been quite successful commercially, especially where R° is an ester group. However hydroxymethyl vinyl oxazolines, and particularly those wherein R' is from zero to four carbon atoms, have been difficult to prepare by the method of Jordan et al.

According to the latter method, an alkanolamine corresponding to the formula

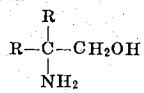

where R is methyl, ethyl or hydroxymethyl, is reacted with an organic acid of the formula R'CH₂COOH, where R' has the same meaning as hereinbefore set forth, to form the oxazoline. The oxazoline is then condensed with formaldehyde to form a hydroxymethyl adduct which is then dehydrated by heating at elevated temperatures to form the vinyl oxazoline. During the prolonged heating step, the hydroxymethyl vinyl oxazolines tend to polymerize, even in the presence of an inhibitor. As a result, yields of the monomer have been relatively low and the product difficult to purify. Such products have excellent properties and a need exists for an improved method of preparation.

In U. S. Pat. No. 2,831,858, P. L. deBeneville et al. disclosed vinyl oxazolines wherein each R° in the above formula can be hydrogen or one can be hydrogen and the other can be alkyl of up to seven carbon atoms. R² can be hydrogen or methyl. The compounds can be prepared by reacting an amino alcohol, limited to those having the carbinol group attached to the tertiary carbon onto which alkyl and amino radicals are bonded, with a lower alkyl ester of acrylic or methacrylic acid in the presence of, e.g., aluminum propoxide. A typical amino alcohol is 2-amino-2-methyl-1-propanol which yields a vinyl oxazoline wherein each R° of the above formula in hydrogen. These products were active biologically but apparently lacked the particular properties in polymers where the hydroxymethyl vinyl oxazolines were of value.

Thus the deBeneville process did not compensate for the disadvantages in the Jordan process because the aminoalkanediols and aminoalkanetriols were inoperable in the deBeneville process. There was thus no provision for the production of hydroxymethyl vinyl oxazolines.

SUMMARY OF THE INVENTION

It is an object of this invention to provide a process for the production of hydroxymethyl vinyl oxazolines.

It is another object of this invention to provide an improved process for the production of vinyl oxazoline monomers suitable for the preparation of homopolymers and copolymers.

Other objects of this invention will be apparent to those skilled in the art from the description herein.

According to the discovery of the present invention, hydroxymethyl vinyl oxazolines corresponding to the formula

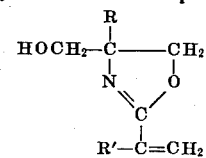

where R is methyl, ethyl or hydroxymethyl, and R' is hydrogen or methyl, are prepared in good yield and in high purity, e.g. over 90 percent, by a 2-step process wherein an alkanolamine corresponding to the formula

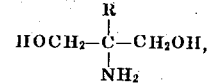

is reacted with a lower alkyl ester of acrylic acid or methacrylic acid in the presence of a catalyst and a polymerization inhibitor at reflux temperatures thereby forming the corresponding amide. The amide is then filtered to remove any solids, e.g. catalyst. It is then heated rapidly to within about 165°–210° C. for a period of time sufficient to convert it to hydroxymethyl vinyl oxazoline in the vapor phase. The product is recovered by condensation of the vapors.

DETAILED DISCUSSION

According to the present invention, the alkanolamine and the acrylate or methacrylate ester are mixed in a mole ratio of from about 0.8–1.2 moles of alkanolamine per mole of ester. Preferably however the ratio is within the range of 0.9–1.1:1, respectively, and a ratio of about 0.9:1 is particularly preferred. To the mixture is added a catalyst in an amount of about 0.025–0.25 g/100 g of reactants, and a polymerization inhibitor in an amount of about 0.05–0.1g/100g of reactants. The reaction mixture is then transferred to a reaction vessel equipped with a reflux condenser, a heat source, a pressure reduction means, and a take-off head.

The mixture is heated, generally, but not necessarily, at reduced pressure, under total reflux conditions until it is determined that the alkanol portion of the ester is being separated. The reflux ratio is then, preferably but not necessarily, adjusted initially to about 3:1 and then eventually to total take-off, whereby the alkanol, as well as any excess ester, is separated from the reaction mixture.

The reaction mixture in the vessel is an alkanolamine corresponding to the formula

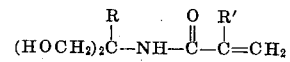

where R and R' have the same meaning hereinbefore defined.

The alkanolamide is then decanted or, preferably but not necessarily, filtered to remove any insoluble material. Additional polymerization inhibitor, 0.05–0.1g/100g, is added. The amide is then converted to the hydroxymethyl vinyl oxazoline by the step of heating to a temperature of 165°–210° C., preferably to within the range of 185°–200° C. and maintaining at that temperature for a period of time sufficient to effect dehydration, simultaneously removing the oxazoline thereby formed from the reaction zone by evaporative distillation, and recovering the oxazoline by condensation. It is preferable to avoid subjecting the oxazoline to excess heating in order to avoid a tendency to polymerize or other side reactions. Excess heating of the oxazoline can be advantageously avoided by conducting the heating step at a reduced pressure of, e.g. 1–50 mm, preferably 1–30 mm. Under these conditions, the oxazoline evaporates as it is formed and the vapors, mixed with water vapor, are conducted out of the heated reaction zone and thence to a condensation zone at a temperature above that which would condense water vapor where the oxazoline vapors are condensed to a liquid. The liquid is then collected and the water vapor is subsequently condensed in a cold trap.

The residence time of the alkanolamide reactant and the resulting oxazoline should be within about 10–30 min. for complete dehydration and distillation.

Preferably the dehydration step is effected by incrementally introducing the amide into a heated reaction zone in the presence of a polymerization inhibitor and at reduced pressure. Preferably the increments should be as small as practical for processing the amount involved. The advantage gained is that amide is heated very quickly to dehydration temperature and the vinyl oxazoline thereby produced is vaporized with little or no delay, thus minimizing any tendency to polymerize. It is understood of course that the practice of this invention is not limited to incremental heating and vaporization.

The alkanolamines suitable for the practice of this invention are those in which, to the carbon atom adjacent to the amino group, there are bonded three hydroxyalkyl groups or two hydroxyalkyl groups and an alkyl group, e.g. a methyl or ethyl group. These alkanolamines include but are not limited to 2-amino-2-methyl-1,3-propanediol; 2-amino-2-ethyl-1,3-propanediol; and 2-amino-2-hydroxymethyl-1,3-propanediol. These latter compounds are preferred because they are commercially available and the usual commercial grade is suitable for the practice of this invention. Other alkanolamines meeting the foregoing definition are also suitable.

The acrylate and methacrylate esters suitable for the practice of this invention correspond to the formula

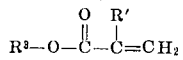

where $R^3$ is methyl or ethyl and $R'$ has the same meaning hereinbefore defined. The methyl and ethyl esters of acrylic and methacrylic acids are preferred. These esters are commercially available and the usual commercial grades are suitable for the practice of this invention. The methyl ester is generally preferred.

The catalysts suitable for the practice of this invention include lithium metal, or alkoxides of lithium, sodium or potassium. The alkoxides can be the methoxides, ethoxides, propoxides or butoxides, preferably the methoxide. The particularly preferred catalyst is lithium metal, preferably in sub-divided form. The amount of catalyst used is generally in the range of about 0.025 to 0.25 g per 100 g of reactants. Generally about 0.025 g/100 g is sufficient and therefore preferred.

The polymerization inhibitor suitable for the practice of this invention can be any of the inhibitors known in the art, of which there are many, or a mixture thereof. Typical inhibitors include, but are not limited to, substituted catechols; 2,6-di-tertiary-butyl-4-methylphenol (e.g. Ionol, marketed by Shell Chem. Co.,); and substituted hydroquinones such as 2,5-di-tertiary-amyl hydroquinone and 2,5-di-tertiary-butyl hydroquinone. It is understood that the invention is not limited to a particular polymerization inhibitor. Preferably the inhibitor is not substantially more volatile than the amide intermediates.

The invention will be better understood by referring to the following examples. It is understood however that the examples are intended only for illustration and it is not intended that the invention be limited thereby.

EXAMPLE 1

2-Amino-2-ethyl-1,3-propanediol (AEPD), 119 g (1 mole), and methyl methacrylate, 100 g (1 mole), were charged to a 500 ml round-bottom flask equipped with an agitator, an air sparger, and a thermometer. Sodium methoxide, 0.50 g, and di-tertiary-amyl hydroquinone (AHQ), 0.50 g, were dispersed therein. Dry air was introduced under the surface of the liquid and heat was applied to the reaction mixture at atmospheric pressure. The column head was set for total reflux. At a vapor temperature of 65° and a liquid temperature of 95°, distillate removal was begun at a reflux ratio of about 3:1. After about 2 hours, the liquid temperature had risen to 136° and the vapor temperature to 67°. About 28 g of distillate - mostly methanol - had been collected. The reaction product in the pot was the amide of methacrylic acid and AEPD.

Another 0.50 g of AHQ was added and the pressure was reduced to <2mm. At a liquid temperature of 122° and vapor temperature of 95° C. the reaction mixture began to distill. After about 2 hours, the liquid temperature had risen to 145° C. and the vapor temperature to 124° C. The distillate, 127.3 g, had a neutralization equivalent of 169.58. The infrared spectrum was consistent for the expected 4-hydroxy-methyl-4-ethyl-2-isopropenyl-2-oxazoline. The pot residue, 33.4 g, was determined to be polymerized material.

EXAMPLE 2

The experiment of Example 1 was repeated in all essential details except that 110 g (1.1 mole) of methyl methacrylate was employed and lithium metal, 0.1 g, was substituted for sodium methoxide. The lithium was subdivided into 5 pieces of varying dimensions. The AHQ was reduced to 0.10 g from 0.50 g as in Example 1, and the pressure was reduced to 300 mm. After about 90 min. of heating, the liquid temperature had reached 90° and was beginning to drop and the vapor had reached a high of 50°, then dropped to 36°. The distillate weighed 41.1 g. The amine residue, 192.0 g was decanted from the lithium catalyst. The amide had a neutralization equivalent of 841.57, and the infrared spectrum was consistent with the expected amide.

To a major portion of the amide residue, 180.7 g, there was added 0.10 g of AHQ, and 0.1 g Ionol. To the distilling flask of a rotary evaporator there was added 0.3 g of AHQ. The flask was heated in an oil bath at about 200° C. and 20 mm and the amide was introduced incrementally thereinto over a period of about 75 min. There was distilled, in about 90 min., 143.0 g of water-white, fluid product having a neutral equivalent of 184.18. The infrared spectrum was consistent with the expected product. The residue was 9.5 g of fluid, water-dispersible material. The yield of oxazoline, based on AEPD, was about 90 percent.

EXAMPLE 3

A. The experiment of Example 2 was repeated in all essential details except that ethyl methacrylate (114 g, 1 mole) was substituted for methyl methacrylate. The reaction mixture was heated at 67°–100° C. and 300 mm. The distillate, largely ethanol, weighed 43.8 g and the residue - the amide - weighed 196.9 g.

To 132.6 g of amide was added 0.10 g of Ionol. Into the distilling flask of a rotary evaporator was placed 0.30 g of AHQ. The amide was incrementally injected into the heated distilling flask at about 200° C. and 15 mm pressure over a period of about 90 min. There was distilled 93.6 of water-white fluid having a neutralization equivalent of 186.30 indicating the expected product of 91 percent purity. The infrared spectrum was consistent with the expected product. The residue weighed 9.6 g and the yield based on AEPD was 82.5 percent.

B. The foregoing experiment was repeated except that butyl methacrylate was substituted for ethyl methacrylate. During the first heating period, however, no distillate was collected. Methanol, 10 g, was added, and subsequently 10 g of distillate was collected. Solid polymers began developing in the flask and the heating was discontinued. The polymer was identified as polymeric butyl methacrylate.

EXAMPLE 4

The experiment of Example 1 was repeated in all essential details except that only 0.10 g of AHQ was employed, and lithium metal, 0.05 g, cut into several pieces, was substituted for sodium methoxide. The first heating period was conducted at 40°–84° C. and 300 mm. pressure. There was collected 37.4 g of distillate leaving a residue of 187.0 g of amide.

Ionol, 0.30 g, was added to 152 g of the reaction mixture which was then introduced incrementally over a period of about 100 min. into a rotary evaporator containing AHQ, 0.10 g, at a temperature of 175°–183° C. and at 20 mm pressure. The distillate, 100 g, had a neutral equivalent of 174.36, and was water-white. The yield based on AEPD was 73 percent.

EXAMPLE 5

The experiment of Example 4 was repeated in all essential details except that 105 g (1.05 mole) of methyl methacrylate was employed and 3 ml of methanol was added. During the first heating period, the pressure was 200 mm and the liquid temperature rose from 50° to 78°. No air sparge was used in this example. There was obtained 42.6 g of distillate and 189.2 g. of residue having a neutral equivalent of 635.88.

The residue was filtered to separate the lithium. To 82.5 g of the filtrate there was added 0.1 g of Ionol. It was then introduced incrementally into the rotary evaporator containing 0.20 g AHQ at a temperature of 172°–182° C. and a pressure of 15 mm. There was obtained 56.3 g of water-white fluid distillate having a neutral equivalent of 171.29 (169 theoretical). Analysis showed a purity of 97.8 percent for a yield of 76.3 percent.

EXAMPLE 6

The experiment of Example 5 is repeated in all essential details except that 2-amino-2-methyl-1,3-propanediol, 1 mole, is substituted for AEPD. There is obtained a good yield of 2-isopropenyl-4-hydroxymethyl-4-methyl-2-oxazoline in high purity.

EXAMPLE 7

The experiment of Example 5 is repeated in all essential details except that 2-amino-2-hydroxymethyl-1,3-propanediol is substituted for AEPD. There is obtained a good yield of 2-isopropenyl-4,4-bis(hydroxymethyl)-2-oxazoline in high purity.

EXAMPLE 8

The experiment of Example 2 is repeated in all essential details except that potassium methoxide is substituted for lithium metal. There is obtained a fairly good yield of 2-isopropenyl-4-hydroxymethyl-4-ethyl-2-oxazoline of high purity, but the pot residue is polymeric.

EXAMPLE 9

The experiment of Example 2 is repeated in all essential details except that methyl acrylate, 1.1 mole, is substituted for methyl methacrylate. There is obtained a good yield of 2-ethenyl-4-hydroxymethyl-4-ethyl-2-oxazoline in high purity.

EXAMPLE 10

The experiment of Example 2 is repeated in all essential details except that ethyl acrylate, 1.1 mole, is substituted for methyl methacrylate. There is obtained a good yield of 2-ethenyl-4-hydroxymethyl-4-ethyl-2-oxazoline in high purity.

I claim:

1. A process for the production of an oxazoline corresponding to the formula $$HOCH_2-\underset{\underset{C}{\overset{\|}{N}}}{\overset{R}{\underset{|}{C}}}-CH_2$$
$$R'-C=CH_2$$

wherein R is methyl, ethyl or hydroxymethyl and R' is hydrogen or methyl, comprising the steps of a. reacting an alkanolamine corresponding to the formula $$HOCH_2-\underset{NH_2}{\overset{R}{\underset{|}{C}}}-CH_2OH,$$

wherein R has the same meaning defined above with an ester corresponding to the formula $$R^3-O-\underset{}{\overset{O}{\overset{\|}{C}}}-\underset{}{\overset{R'}{\underset{|}{C}}}=CH_2$$

wherein $R^3$ is methyl or ethyl and R' is hydrogen or methyl, in a mole ratio of 0.8–1.2:1 in the presence of a catalyst selected from the group consisting of lithium metal, sodium alkoxide or potassium alkoxide, said alkoxide being methoxide or ethoxide, and a polymerization inhibitor at a pressure within the range of 200 mm to about one atmosphere at a temperature of about 50° to about 100° C. thereby forming the corresponding amide, b. heating said amide in the presence of a polymerization inhibitor under evaporator distillation conditions of reduced pressure within about 1 to about 50 mm and elevated temperatures, within 165° to about 210° C., thereby forming said oxazoline and recovering same as a distillate.

2. The process of claim 1 wherein said catalyst is lithium metal.

3. The process of claim 1 wherein said alkanolamine is 2-amino-2-methyl-1,3-propanediol.

4. The process of claim 1 wherein said alkanolamine is 2-amino-2-ethyl-1,3-propanediol.

5. The process of claim 1 wherein said alkanolamine is 2-amino-2-hydroxymethyl-1,3-propanediol.

6. The process of claim 1 wherein said lower alkyl methacrylate ester is methyl methacrylate.

7. The process of claim 1 wherein said lower alkyl methacrylate ester is ethyl methacrylate.

8. The process of claim 1 wherein said ester is methyl acrylate.

9. The process of claim 1 wherein said ester is ethyl acrylate.

10. The process of claim 1 wherein said amide is heated by introducing it incrementally into a heated reaction zone.

11. The process of claim 1 wherein the residence time in step (b) is within about 10 to 30 minutes.

* * * * *

PO-1050
(5/69)

UNITED STATES PATENT OFFICE
CERTIFICATE OF CORRECTION

Patent No. 3,678,065            Dated July 18, 1972

Inventor(s) John A. Frump

It is certified that error appears in the above-identified patent and that said Letters Patent are hereby corrected as shown below:

Column 1, line 59, "in" should be --is--.

Column 2, line 48, "alkanolamine" should be --alkanolamide--.

Claim 1, column 6, line 33 "evaporator" should be --evaporative--.

Signed and sealed this 26th day of December 1972.

(SEAL)
Attest:

EDWARD M. FLETCHER, JR.            ROBERT GOTTSCHALK
Attesting Officer                  Commissioner of Patents